(12) United States Patent
Poirier et al.

(10) Patent No.: US 12,070,826 B2
(45) Date of Patent: Aug. 27, 2024

(54) METHOD FOR SUPPLYING CRYOGENIC FLUID TO A MACHINING MACHINE

(71) Applicant: L'Air Liquide, Société Anonyme pour l'Etude et l'Exploitation des Procédés Georges Claude, Paris (FR)

(72) Inventors: Alban Poirier, Le Chesnay (FR); Marc Gravier, Courbevoie (FR); Fabrice Bouquin, Guyancourt (FR); Etienne Charve, Vanves (FR); Olivier Matile, La Garenne Colombes (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 375 days.

(21) Appl. No.: 17/604,538

(22) PCT Filed: Apr. 6, 2020

(86) PCT No.: PCT/EP2020/059796
§ 371 (c)(1),
(2) Date: Oct. 18, 2021

(87) PCT Pub. No.: WO2020/212187
PCT Pub. Date: Oct. 22, 2020

(65) Prior Publication Data
US 2022/0203490 A1    Jun. 30, 2022

(30) Foreign Application Priority Data
Apr. 18, 2019    (FR) .................................... 1904159

(51) Int. Cl.
B23Q 11/10    (2006.01)
F17C 7/02     (2006.01)
F17C 13/04    (2006.01)

(52) U.S. Cl.
CPC ...... *B23Q 11/1053* (2013.01); *B23Q 11/1076* (2013.01); *F17C 7/02* (2013.01);
(Continued)

(58) Field of Classification Search
CPC ............ B23Q 11/1053; B23Q 11/1038; B23Q 11/1076; F17C 7/02; F17C 2221/014;
(Continued)

(56) References Cited

U.S. PATENT DOCUMENTS 10,466,088 B2 * 11/2019 Pathier ................. F25B 19/005
2010/0272530 A1 * 10/2010 Rozzi ................. B23Q 11/1053
408/56

(Continued)

FOREIGN PATENT DOCUMENTS

EP    2 915 624        9/2015
EP    2915624 A1 *    9/2015    ......... B23Q 11/1053
(Continued)

OTHER PUBLICATIONS

International Search Report for corresponding PCT/FR2020/059796, Jun. 9, 2020.

*Primary Examiner* — Bayan Salone
(74) *Attorney, Agent, or Firm* — Elwood L. Haynes

(57) ABSTRACT

A method for machining workpieces, having a cryogenic fluid intake in a machining zone, including locating a valve on the line connecting a fluid source to a machining tool in the machining zone, the valve self-regulates the degree of opening according to the pressure required downstream thereof, the valve is located inside a cold box for implementing the cryogenic fluid and provides a fixed and adjustable pressure, and a fixed adjustable flow, to the machining tool, irrespective of the tool that is used, and the number of orifices and the diameter of the fluid ejection orifices in the tool.

4 Claims, 1 Drawing Sheet

(52) U.S. Cl.
CPC ........ *F17C 13/04* (2013.01); *F17C 2221/014* (2013.01); *F17C 2223/0169* (2013.01); *F17C 2225/0169* (2013.01); *F17C 2270/0545* (2013.01)

(58) Field of Classification Search
CPC .............. F17C 13/04; F17C 2223/0169; F17C 2225/0169; F17C 2270/0545; Y02P 70/10
See application file for complete search history.

(56) References Cited

U.S. PATENT DOCUMENTS

| | | | |
|---|---|---|---|
| 2013/0098106 A1* | 4/2013 | Davidian | F25J 3/0486 62/643 |
| 2016/0053943 A1* | 2/2016 | Kowalewski | F17C 13/04 62/50.4 |
| 2018/0104750 A1* | 4/2018 | Levasseur | B23Q 11/1053 |
| 2018/0340810 A1 | 11/2018 | Pathier | |

FOREIGN PATENT DOCUMENTS

| | | |
|---|---|---|
| EP | 2 986 887 | 2/2016 |
| JP | 2012 524670 | 10/2012 |
| WO | WO 2012 004241 | 1/2012 |
| WO | WO 2016 016546 | 2/2016 |

* cited by examiner

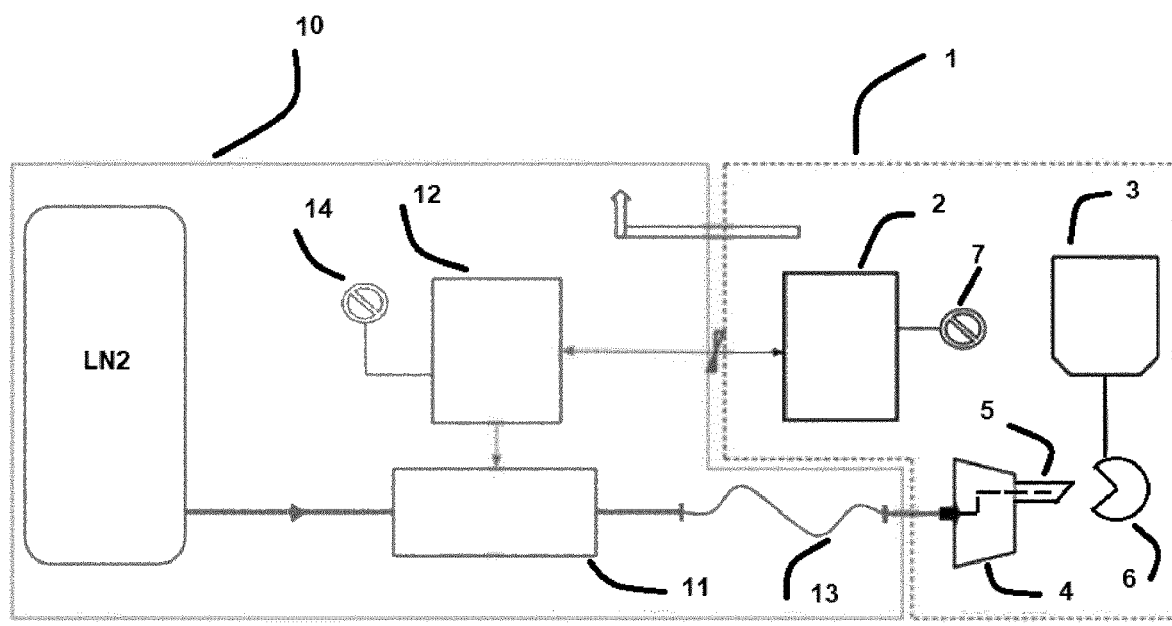

METHOD FOR SUPPLYING CRYOGENIC FLUID TO A MACHINING MACHINE

CROSS REFERENCE TO RELATED APPLICATIONS

This application is a 371 of International Application No. PCT/FR2020/059796, filed Apr. 6, 2020, which claims priority to French Patent Application No. 1904159, filed Apr. 18, 2019, the entire contents of which are incorporated herein by reference.

BACKGROUND

The present invention relates to the field of machining mechanical workpieces.

Machining is a method for shaping workpieces by removing material. The mechanical energy required for machining, and therefore the formation of swarf, is almost completely converted into heat. Despite the good thermal conductivity properties of some machined and machining materials, the use of a cutting fluid remains compulsory in order to ensure:
cooling and lubrication of the cutting zone;
but also the removal of swarf from the work area.

These cutting fluids are predominantly neat or soluble mineral or synthetic based oils. The temperatures encountered at the heart of the cutting zone (currently +800° C. to +1,000° C.) lead to, on the one hand, the production of fumes or gases that are harmful to the external environment, and, on the other hand, to chemical pollution of the swarf and machined surfaces that can even alter their properties.

Oils are a major expense due to their purchase and recycling costs, but also their management. In this context, the lubrication methods, called "micro-lubrication" or "dry lubrication" reduce, and even remove, the consumption of cutting fluids. The machining performance capabilities are degraded, for this reason
these methods are only applied in machining scenarios that only require minimal cooling of the cutting zone (such as machining aluminum based materials, high-speed machining, etc.).

In the other machining scenarios, namely those that require considerable cooling of the cutting zone, machining by adding cryogenic fluid, which will be called "cryogenic machining" hereafter, is a highly attractive solution for cooling and lubricating the cutting zone, combining the advantages of oils (swarf removal, heat transfer fluid, etc.) and those of dry machining (respect for the environment, non-pollution of the generated surfaces, swarf recycling, increased tool life, etc.).

This cryogenic fluid can be nitrogen and $CO_2$.

It should be noted that 3 main machining methods are identified: turning, milling and drilling.

SUMMARY

The aim of the present invention is to propose a system for supplying cryogen, for example, liquid nitrogen, to the machining zone in the best possible conditions, and for allowing the requirements of the machining method to be taken into account, whether it involves turning, miffing, or even drilling.

As will be seen in further detail hereafter, the system enables completely safe communication with the command (control) cabinet associated with the machine-tool.

While considering an existing machining installation hereafter, comprising a machining machine provided with its existing (conventional) command cabinet, the invention proposes using the following two elements, positioned upstream of the machining machine:
a control/command device; and
an item of equipment for implementing cryogen, which can be called "cold box" ("skid");
with the control/command device of the invention communicating with the existing command cabinet of the machining machine in order to:
obtain a "GO" command for starting-up the machining machine and a "STOP" command at the end of machining;
receive a number or a program name from the machining machine according to the workpiece that will be processed and the processing that will be applied thereto;
receive a request for fluid, for example, nitrogen gas or liquid nitrogen, i.e. the machining center requests fluid and waits for the control/command device to confirm that the required operating conditions are met;
provide, from the control/command device, the machining machine with a "GO" command when the fluid supply is available and is considered to be performed in the conditions required downstream (which will be defined hereafter, i.e, according to the program, etc.).

In particular, within the scope of the present invention, the aim is to allow cryogen (for example, nitrogen) to be provided in liquid form at the inlet of the machining station upon start-up of the cycle, as stated by the command cabinet, and to maintain the features of this liquid cryogen throughout the machining operation for the workpiece in question. The criteria to be followed mainly involve the temperature, the pressure and the two-phase rate of the fluid arriving at the machining station.

According to advantageous embodiments of the invention, the following will also be sought:
providing a constant flow of fluid during machining, which flow is adapted for each tool and cutting phase irrespective of the cutting tools used. Several phenomena can be mentioned in this respect:
excessive flow can weaken the cutting tool and cause premature breakage; and
each cutting tool does not dissipate as much energy;
between each manufacturing step, each program, which leads to a change of cutting tool (disconnection, then reconnection of the tool at the end of the spindle), the intention is for the system to purge (gas purge) the entire fluid supply, for example, nitrogen, for example, initially from the cold box to the end of the spindle, then from the cold box to the cutting tool.
Indeed, it is important to:
purge the liquid for safety reasons;
heat the tool holder to promote better disconnection;
remove any moisture in the new cutting tool and remove any residues (swarf, for example), this moisture and these residues could cause a blockage in the direct supply of liquid nitrogen and therefore the constant flow of liquid nitrogen required for the method would no longer be provided.

With a simple injection, using a simple All Or Nothing (AON) valve as a control valve, there would be a flow of liquid nitrogen that is proportionate to the sum of the surfaces of the holes on the cutting tool (or even limited to the diameter of the spline in the tool spindle), The more holes in the tool, the greater the flow of liquid nitrogen.

Therefore, according to the present invention, the use of a cryogenic control valve is proposed that self-regulates its degree of opening according to the pressure required downstream thereof. This allows a fixed adjustable pressure to be provided upstream of the orifices for injecting liquid nitrogen into the cutting tool, and therefore allows a fixed but adjustable flow to be provided.

Pressure, and therefore flow, control can be stipulated for each machining program. This allows the optimal flow of liquid nitrogen to be obtained, whilst maintaining the diameters and through-holes for the liquid nitrogen. Sometimes the number and the position of these holes cannot be managed and can be dictated by other requirements.

The invention thus relates to a method for machining workpieces, implementing a cryogenic fluid intake in the machining zone, characterized in that, on the line connecting the fluid source to the machining tool in the machining zone, a valve is implemented that is able to self-regulate its degree of opening according to the pressure required downstream thereof, allowing a fixed and adjustable pressure, and therefore a fixed adjustable flow, to be delivered to the machining tool, irrespective of the tool that is used, and therefore of the number of orifices and the diameter of the fluid ejection orifices characterizing the tool in question.

Hereafter, reference will be made to a fluid, gas, nitrogen, whilst always bearing in mind that the fluid that is used can be liquid nitrogen or another cryogenic fluid, that the purge gas can be nitrogen gas or $CO_2$ gas or another gas, etc.

The invention can also advantageously adopt one or more of the following embodiment(s):

Cooling ensures that the nitrogen is always at a temperature close to the equilibrium point of liquid nitrogen, which ensures that it is in the liquid phase and not in the gas phase (and in any case minimizes the two-phase rate). Cooling is performed up to the outlet of the cold box (11 in the appended FIGURE), upstream of the hose 13 in the appended FIGURE.

Purge: During the entire machining cycle, the temperature of the nitrogen is controlled (for example, just before entering the machining center): if this temperature rises above a setpoint (close to the equilibrium point), the purge valve is opened in order to draw in nitrogen and purge the gas part that has not been sufficiently purged, for example, in a degassing pot. During this cooling phase a stop contact is provided at the machining center.

Alongside the temperature criterion, there is a possibility of controlling the cryogen pressure, for example, liquid nitrogen, delivered according to a setpoint of the machining program that is followed via a degree of opening self-regulated on the valve setpoint.

Controlling these 2 temperature and pressure parameters ensures the stability of the supply of nitrogen in terms of temperature, pressure and two-phase rate.

Tool disconnection: Purging the liquid nitrogen orifices and splines with nitrogen gas during each tool change and upon start-up of the installation enables cleaning and enables moisture to be removed.

This purging can be a timed injection of nitrogen gas each time a machining program is changed. Depending on the type of tool, there is a "program" for setting this purge time.

Nitrogen allows the tool holder to be heated in order to help disconnection. For this function, nitrogen gas could be pre-heated in order to assist this heating.

According to one of the embodiments of the invention, the temperature of the delivered fluid is measured, for example, just before it enters the machining zone, and the flow that is used is adapted according to this fluid temperature measurement. In particular, it can be seen that, when the upstream fluid store has been recently filled, the fluid is in the sub-cooled state, therefore colder than normal, it is then advantageous for the pressure supplied by said control valve to be adjusted in order to reduce the supplied flow, while maintaining the same available energy. "Recently" is understood to mean filled at most a few hours beforehand, and even a day beforehand.

BRIEF DESCRIPTION OF THE DRAWING

For a further understanding of the nature and objects for the present invention, reference should be made to the following detailed description, taken in conjunction with the accompanying drawing, in which like elements are given the same or analogous reference numbers and wherein:

FIG. 1 provides a partial schematic view of an installation suitable for implementing the invention.

NOMENCLATURE OF FIG. 1

1: the machining center;
2: the command cabinet for the machining center;
3: spindle;
4: tool post or tool holder;
5: tool;
6: workpiece to be machined;
7: safety sensors;
10: installation suitable for implementing the invention;
11: implementation equipment/cold box (comprising the control valve);
12: control/command device of the invention;
13: hose;
14: safety sensors.

DETAILED DESCRIPTION OF PREFERRED EMBODIMENTS

The previous approach of document EP-2986887 (in the name of the Applicant) is known, which approach was different.

Indeed, if the present invention relates to controlling the pressure delivered to the machining station, with this being according to a "program" implemented in this station, i.e. for all and each tool condition that is implemented, number of orifices, diameter of these orifices, etc., the procedure according to these prior works focused on supplying a plurality of machining stations in parallel, with sub-cooled liquid, at a fixed pressure at each station, and to this end immersed cryogen in a cryogenic bath, before it reached the machining station.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for machining workpieces, comprising a cryogenic fluid intake in a machining zone, comprising, locating a valve on a line connecting a fluid source to a machining tool in the machining zone, the valve self-regulates a degree of opening according to a pressure required downstream thereof, the valve is located inside a cold box for implementing the cryogenic fluid and provides a fixed and adjustable pressure, and a fixed adjustable flow, to the machining tool, irrespective of the type of machining that is used, and a number of orifices and a diameter of the fluid ejection orifices in the machining tool, wherein, upon start-up, and between two machining operations resulting in a machining tool change, and in the disconnection and reconnection of tools at the end of a spindle, gas is purged from the line using nitrogen gas, between the cold box and the machining tool, from the cold box to the end of the spindle initially, then from the cold box to the machining tool, with the supplied gas allowing a machining tool holder to be heated and thus assist the disconnection.

2. The method as claimed in claim 1, wherein the gas used for purging is preheated.

3. The method as claimed in claim 1, wherein a temperature of the delivered fluid is measured just before it enters the machining zone, and the flow that is used is selected according to this fluid temperature measurement.

4. The method as claimed in claim 3, wherein, when an upstream fluid source has been recently filled, with the fluid then being in a sub-cooled state, then the pressure supplied by said valve is adjusted in order to reduce the supplied flow, whilst keeping the same energy available.

\* \* \* \* \*